US008421261B2

(12) United States Patent
Drews

(10) Patent No.: US 8,421,261 B2
(45) Date of Patent: Apr. 16, 2013

(54) WATER WHEEL COMPRISING A BUILT-IN GENERATOR

(76) Inventor: Hartmuth Drews, Pinneberg (DE)

( * ) Notice: Subject to any disclaimer, the term of this patent is extended or adjusted under 35 U.S.C. 154(b) by 387 days.

(21) Appl. No.: 12/989,926

(22) PCT Filed: Apr. 28, 2009

(86) PCT No.: PCT/DE2009/000608
§ 371 (c)(1),
(2), (4) Date: Oct. 27, 2010

(87) PCT Pub. No.: WO2009/132637

PCT Pub. Date: Nov. 5, 2009

(65) Prior Publication Data
US 2011/0042957 A1    Feb. 24, 2011

(30) Foreign Application Priority Data

May 2, 2008    (DE) .......................... 10 2008 022 012
Mar. 26, 2009    (DE) .......................... 10 2009 015 044

(51) Int. Cl.
*F03B 13/00*    (2006.01)
*H02P 9/04*    (2006.01)
*F03D 9/00*    (2006.01)

(52) U.S. Cl.
USPC ................................. 290/54; 290/44; 290/55

(58) Field of Classification Search .................... 290/44, 290/54, 55
See application file for complete search history.

(56) References Cited

U.S. PATENT DOCUMENTS

| 2,097,286 A | 10/1937 | McGee | 290/54 |
| 2,782,321 A | 2/1957 | Fischer | 290/4 R |
| 3,209,156 A | 9/1965 | Struble, Jr. | 290/54 |
| 4,168,439 A * | 9/1979 | Palma | 290/44 |
| 4,289,970 A * | 9/1981 | Deibert | 290/44 |
| 4,330,714 A * | 5/1982 | Smith | 290/55 |
| 4,720,640 A | 1/1988 | Anderson et al. | 290/43 |
| 4,737,070 A | 4/1988 | Horiuchi et al. | 415/7 |
| 4,832,569 A * | 5/1989 | Samuelsen et al. | 416/17 |
| 5,315,159 A * | 5/1994 | Gribnau | 290/55 |
| 6,064,123 A * | 5/2000 | Gislason | 290/55 |

(Continued)

FOREIGN PATENT DOCUMENTS

| DE | 102 18 443 | 11/2003 |
| DE | 202006001171 | 6/2007 |
| EP | 1 876 350 | 1/2008 |
| GB | 2 435 494 | 8/2007 |

OTHER PUBLICATIONS

International Search Report of the International Searching Authority for International Application PCT/DE2009/000608, mailed Nov. 4, 2010, 3 pages, European Patent Office, HV Rijswijk, Netherlands.

(Continued)

*Primary Examiner* — Pedro J Cuevas
(74) *Attorney, Agent, or Firm* — W. F. Fasse

(57) ABSTRACT

In a water wheel with an integrated electrical generator, a ring element for forming a rotor is rigidly concentrically connected with the water wheel. The ring element is assembled of modular individual segments with inserted permanent magnets. At least one corresponding partial ring as a stator is allocated to the rotor, whereby each partial ring carries electrical coils in correlation to the permanent magnets of the ring element of the rotor. The partial rings of the stator are stationarily mounted by holding elements on support struts of the water wheel.

22 Claims, 6 Drawing Sheets

U.S. PATENT DOCUMENTS

| | | | | |
|---|---|---|---|---|
| 6,354,800 B1* | 3/2002 | Hays | | 415/202 |
| 6,700,216 B1* | 3/2004 | Vann | | 290/44 |
| 6,806,586 B2* | 10/2004 | Wobben | | 290/54 |
| 6,952,058 B2* | 10/2005 | McCoin | | 290/44 |
| 7,098,552 B2* | 8/2006 | McCoin | | 290/44 |
| 7,109,599 B2* | 9/2006 | Watkins | | 290/55 |
| 7,116,006 B2* | 10/2006 | McCoin | | 290/54 |
| 7,144,214 B2* | 12/2006 | Kinpara et al. | | 415/4.4 |
| 7,199,484 B2* | 4/2007 | Brashears | | 290/54 |
| 7,215,038 B2* | 5/2007 | Bacon | | 290/55 |
| 7,235,894 B2 | 6/2007 | Roos | | 290/54 |
| 7,279,803 B1 | 10/2007 | Bosley | | 290/54 |
| 7,345,377 B2* | 3/2008 | Bacon | | 290/55 |
| 7,358,624 B2* | 4/2008 | Bacon | | 290/55 |
| 7,385,302 B2* | 6/2008 | Jonsson | | 290/54 |
| 7,417,334 B2* | 8/2008 | Uchiyama | | 290/55 |
| 7,550,865 B2* | 6/2009 | Jonsson | | 290/55 |
| 7,604,454 B2* | 10/2009 | Power et al. | | 415/3.1 |
| 7,605,486 B2* | 10/2009 | Bridwell | | 290/43 |
| 7,785,037 B2* | 8/2010 | Lederer et al. | | 405/78 |
| 7,944,069 B2* | 5/2011 | Uchiyama | | 290/44 |
| 8,164,213 B2* | 4/2012 | Mahaffy et al. | | 290/55 |
| 2003/0137149 A1 | 7/2003 | Northrup et al. | | 290/44 |
| 2003/0193198 A1* | 10/2003 | Wobben | | 290/54 |
| 2007/0040385 A1* | 2/2007 | Uchiyama | | 290/44 |
| 2008/0296900 A1* | 12/2008 | Lederer et al. | | 290/54 |
| 2008/0315709 A1* | 12/2008 | Uchiyama | | 310/209 |
| 2010/0133838 A1* | 6/2010 | Borgen | | 290/52 |
| 2012/0086207 A1* | 4/2012 | Gray | | 290/54 |
| 2012/0262036 A1* | 10/2012 | Drews | | 310/75 R |

OTHER PUBLICATIONS

English Translation of PCT International Preliminary Report on Patentability for International Application PCT/DE2009/000608, mailed Feb. 17, 2011, 8 pages, International Bureau of WIPO, Geneva, Switzerland.

* cited by examiner

WATER WHEEL COMPRISING A BUILT-IN GENERATOR

FIELD OF THE INVENTION

The invention relates to a water wheel with an integrated generator, whereby the water wheel is drivable for current generation via allocated water paddles by streaming, jetted or free-falling flowing tail water.

BACKGROUND INFORMATION

As necessitated by the function, water wheels have a relatively low rotational speed with a high torque or rotational moment. Therefore it is typical for the generation of current, to connect a multi-stage mechanical gearing with a shaft stub of the water wheel, and to connect an output shaft of the gearing with a generator via a transmission.

When there are changing water quantities, especially with an increase of the water quantity, the power and the torque are increased, so that the water wheel shaft and the gearing must take up relatively high peak torques.

In practice, therefore, the design of the parts is carried out with a factor of three relative to the normal loading. Thereby, relatively heavy and expensive structural components arise.

These known arrangements have a reduced efficiency, especially due to the mechanical transmission losses. Furthermore, the movable parts are subject to wear and require a complex or costly maintenance.

SUMMARY OF THE INVENTION

It is the object of the invention to provide an arrangement of the general type discussed above without gearing, which makes possible an easy transportability and a modular assembly of a rotor due to a simple construction, and which ensures an adaptation of the stator elements to the existing conditions, and also makes use of the water wheel diameter for the design or embodiment of a generator.

The solution of this object is achieved according to the invention in that a ring element is concentrically connected with the water wheel, which ring element consists of modularly allocated individual segments with inserted permanent magnets for forming a rotor of the generator, and at least one corresponding partial ring as a stator is allocated to the ring element as the rotor, whereby the partial rings comprise electrical coils in correlation to the permanent magnets of the ring element of the rotor, and the partial rings as the stator are stationarily arranged via a support structure of the water wheel by means of support or holding elements.

Hereby, a large generator diameter is made possible, and thereby a simplified transport and an assembly of the rotor parts is ensured, and the stator can be allocated corresponding to the existing potential by individual stator segments. An advantageous embodiment of the invention is that the permanent magnets as a rotor arranged on the ring element are arranged in the area of the front side, the rear side, the inner circumferential or respectively outer circumferential surface of the ring element with allocation of the partial rings with its coils as the stator.

For increasing the efficiency it is provided that a combination of the areas for receiving the permanent magnets is formed.

One embodiment is that the permanent magnets are worked into the structure of the ring element of the rotor in a comb-like manner.

Further it is suggested that the water wheel is formed of wheel rim segments into which the individual segments are integrated for forming the ring element of the rotor.

BRIEF DESCRIPTION OF THE DRAWINGS

Example embodiments of the invention are schematically illustrated in the drawing. It is shown by.

DETAILED DESCRIPTION OF EXAMPLE EMBODIMENTS OF THE INVENTION

Figure 1:
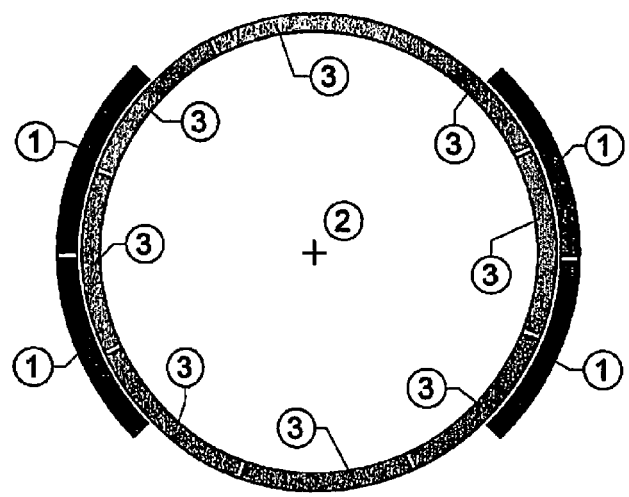
FIG. 1 a principle illustration of a generator embodiment.
Figure 2:
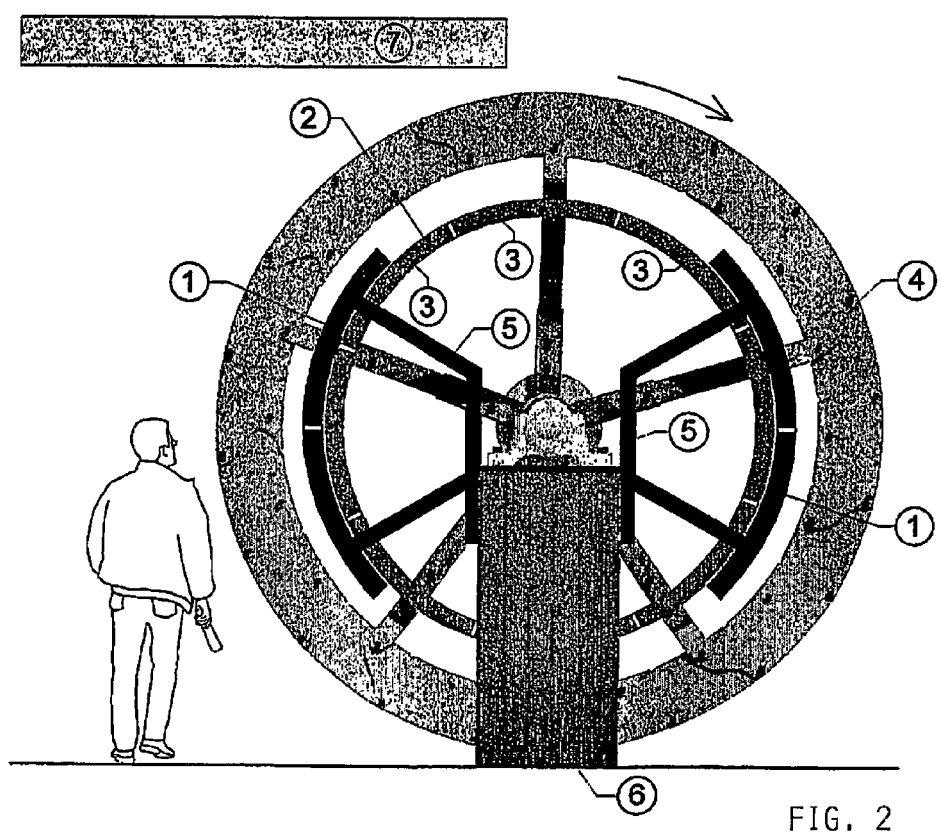
FIG. 2 a generator embodiment in allocation to a water wheel.
Figure 3:
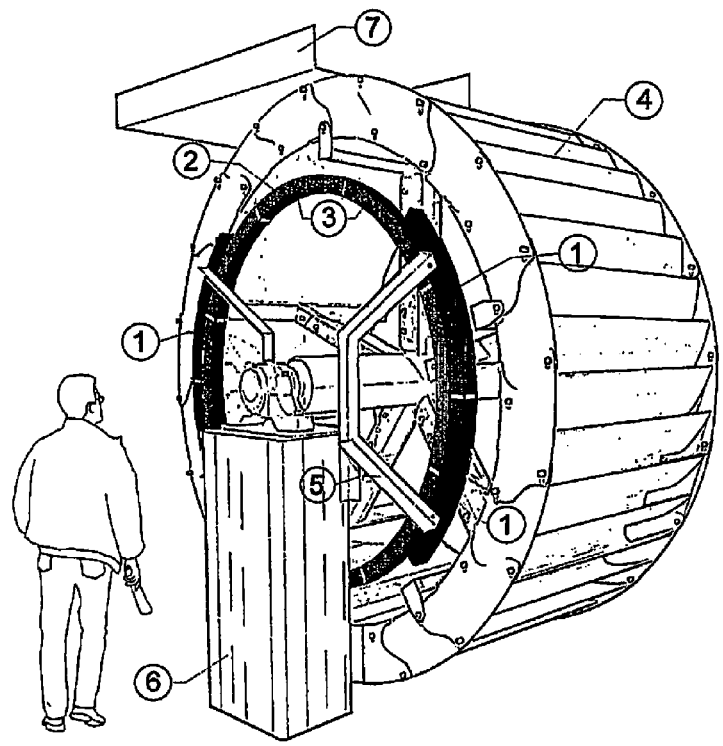
FIG. 3 a perspective illustration to FIG. 2.
Figures 4, 4A:
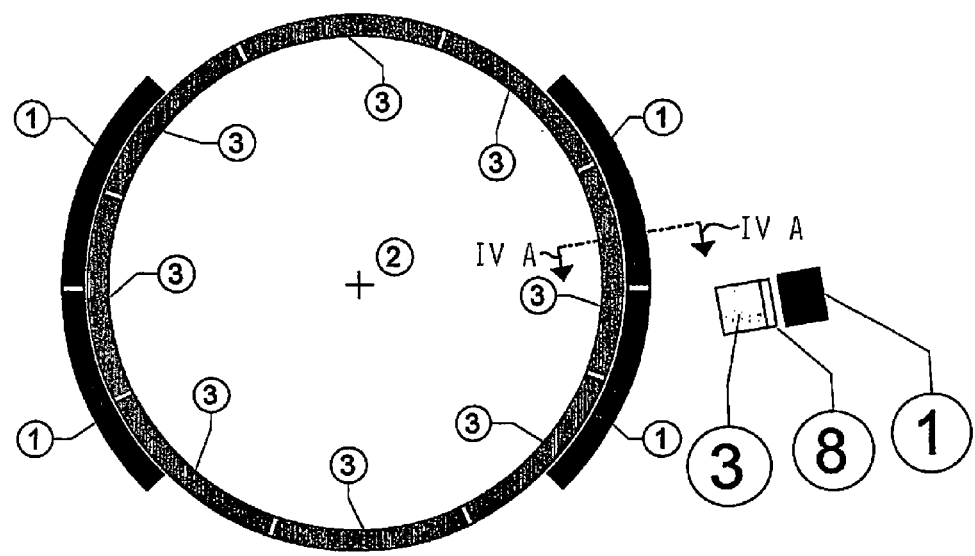
FIG. 4 a side view of a generator with an allocation of permanent magnets on outer surfaces of the ring element.
FIG. 4A a schematic sectional view along the section line IV A-IV A in FIG. 4.
Figures 5, 5A:
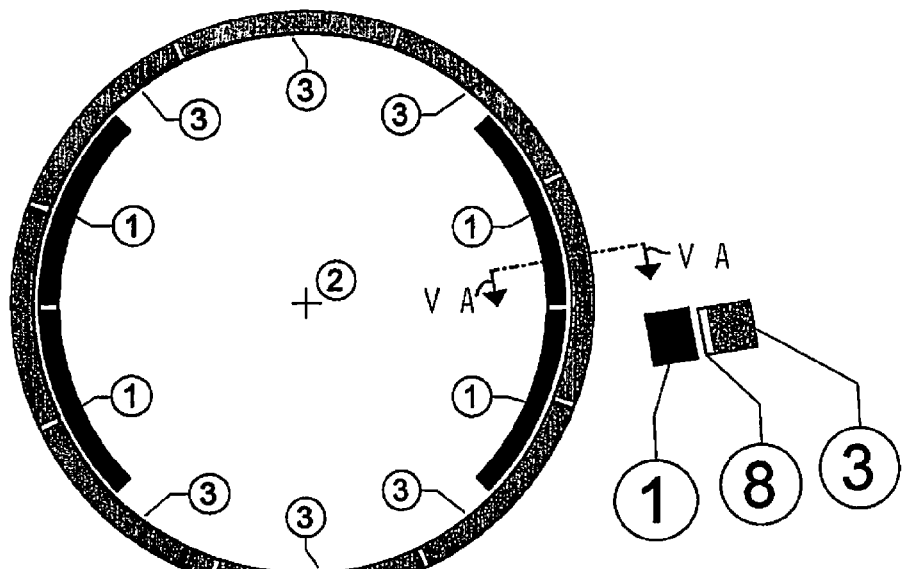
FIG. 5 an alternative embodiment to FIG. 4 with an allocation of permanent magnets on inner surfaces of the ring element.
FIG. 5A a schematic sectional view along the section line V A-V A in FIG. 5.
Figures 6, 6A:
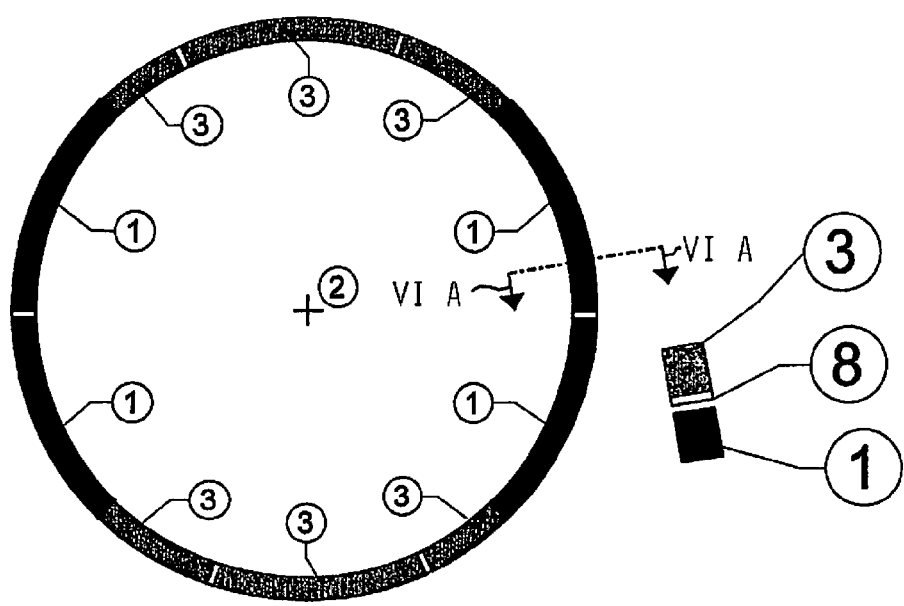
FIG. 6 a further embodiment to FIG. 4, with an allocation of permanent magnets on a front side of the ring element.
FIG. 6A a schematic sectional view along the section line VI A-VI A in FIG. 6.
Figure 8:
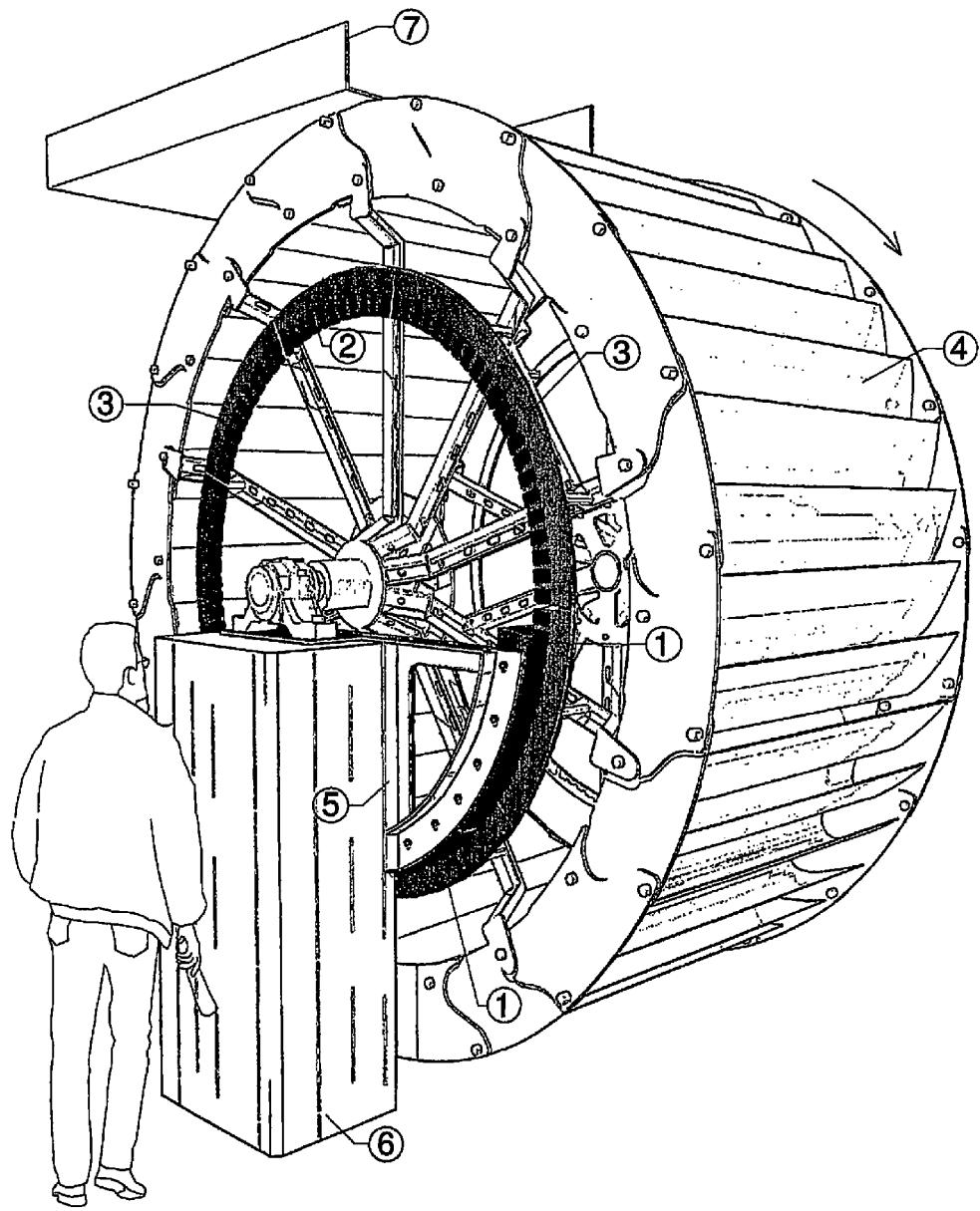
FIG. 8 a perspective illustration of a complete arrangement corresponding to FIG. 7.

In the example embodiments, water wheels 4 are arranged, which are embodied as overshot water wheels 4 with an allocated water feed race or sluice 7 according to FIGS. 2, 3 and 8, and are arranged via or over a stationary foundation 6 in a known manner. Thereby in this case the water wheel 4 is constructed of individual wheel rim elements.

A ring generator is coupled with the water wheel 4, whereby the ring generator is formed by a rotor 2 as a ring element and is rigidly connected with the water wheel 4. In this regard, a connection is established with the arms of the water wheel body or directly on the formed ring.

This ring element as the rotor 2 is modularly assembled of individual segments 3, which are equipped or populated with corresponding permanent magnets 8. In this regard, high power magnets are used, as they are available, for example, under the tradename NEODYN magnets. The permanent magnets 8 in the example embodiments are arranged in the area of the front side, rear side, inner circumferential or respectively outer circumferential surface of the ring element as the rotor 2 with correlation of the partial rings 1 with the coils 9 as the stator.

Figure 7:
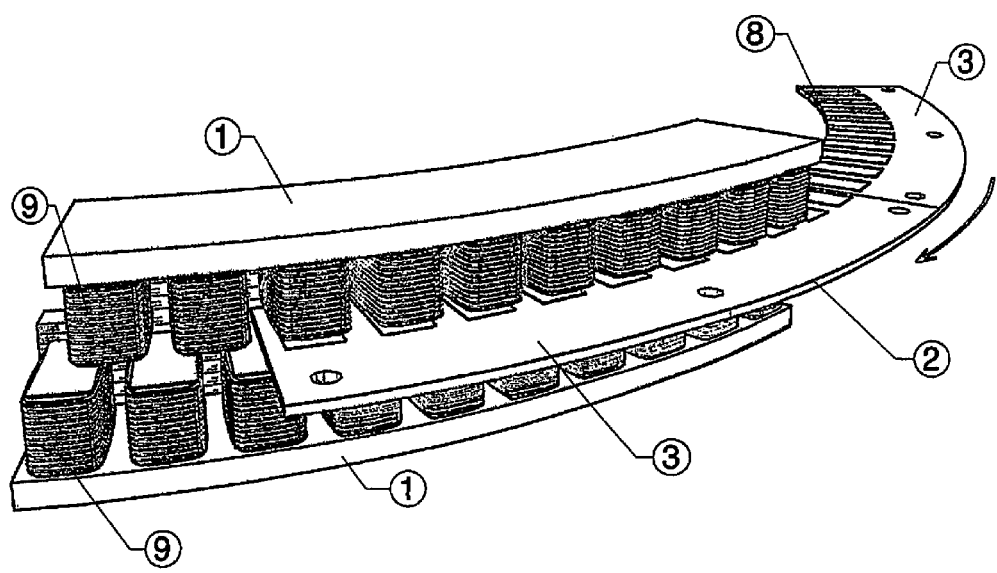
FIG. 7 a perspective partial illustration of rotor and stator, whereby the rotor as a ring element takes-up permanent magnets inserted in a comb-like manner, and stator segments with coils with a half coil offset are allocated on both sides.

According to FIG. 7, permanent magnets 8 are inserted in a comb-like manner into the individual segments 3 of the rotor 2. The individual segments 3 can be produced, for example, in an iron-free manner of synthetic plastic.

Partial rings 1 as the stator are allocated to the rotor 2 with its individual segments 3, whereby the partial rings 1 carry corresponding electrical coils 9, and together with the rotor form a generator. In this regard, the partial rings are arranged via a support structure 6 by means of holding or support elements 5. The number of the partial rings 1 is determined by the existing hydraulic-mechanical potential of a water wheel installation location. It is of course understood that a complete ring can also be arranged.

According to FIG. 7, partial rings 1 of the stator are allocated to both sides of the ring element of the rotor, whereby the coils 9 are arranged offset relative to one another respectively by a half width.

Figure 9:
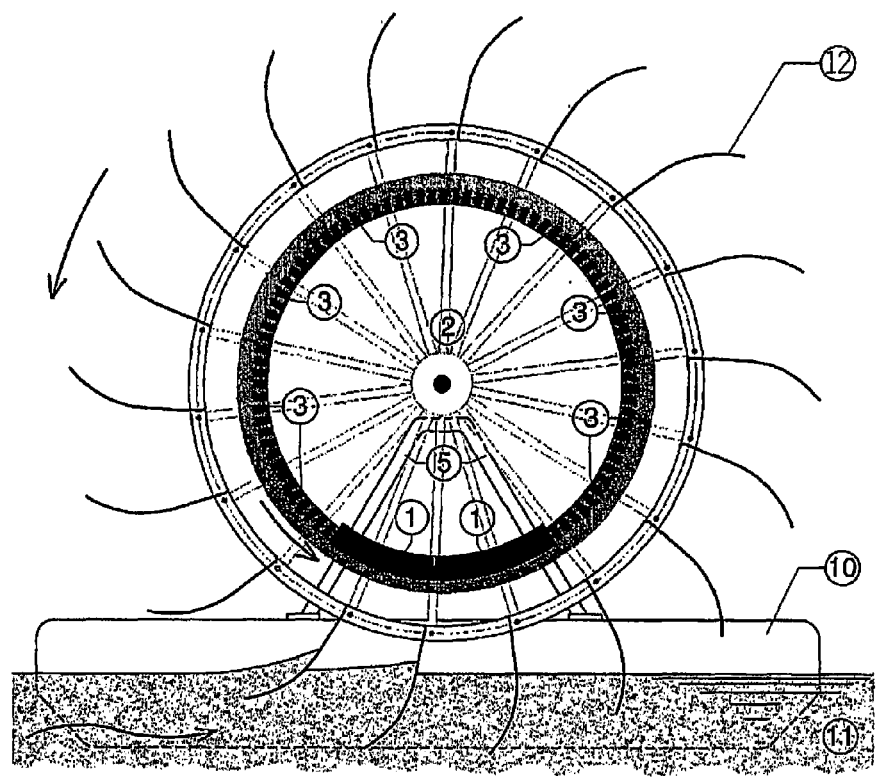
FIG. 9 an alternative arrangement on a flotation body in a flowing body of water.

According to FIG. 9, an anchored flotation body 10 carries a water wheel 4, whereby the associated paddles or blades 12 are driven by the stream flow of a flowing watercourse 11.

Advantageously, the number of the partial rings 1 is adapted or matched to the hydraulic-mechanical potential of the water wheel installation location, whereby these cover the rotor 2 in the bottom third and have an advantageous effect on the flotation characteristics as well as the center of gravity thereof and the security against overturning or capsizing.

Figure 10:
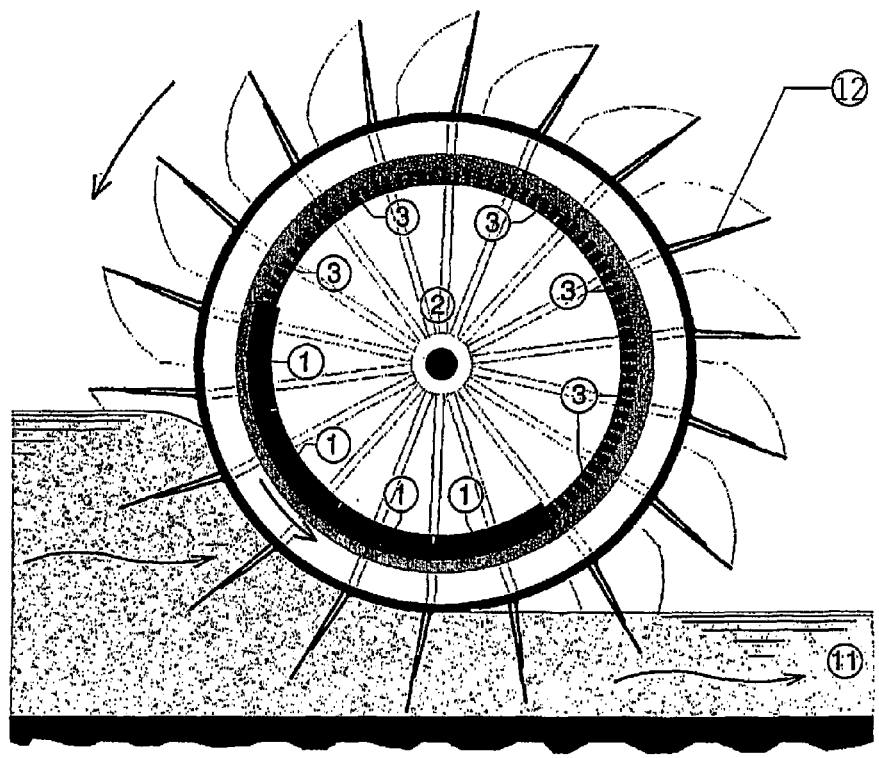
FIG. 10 a further arrangement with a water wheel as a head pressure machine.

In an embodiment of a head pressure machine according to FIG. 10 with a water wheel 4 of which the paddles or buckets 12 are arranged on a cylindrical hollow body, the paddles or buckets 12 are driven both by the gravitational force as well as by the stream flow of the flowing tail watercourse 11.

Advantageously the rotor 2 of the generator is integratively built into the support structure of the cylindrical hollow body, and the number of the ring elements 1 is adapted or matched to the hydraulic-mechanical potential of the water wheel installation location.

It is of course understood that corresponding ring generators can be arranged on both sides of the water wheel 4.

The invention claimed is:

1. A water wheel apparatus comprising:
a stationary support structure;
a water wheel rotatably supported on said stationary support structure such that said water wheel is rotatable about an axis; and
at least one electrical generator including a rotor and a stator;
wherein:
said water wheel includes a wheel structure arranged concentrically about said axis, and blades, paddles or buckets that are carried by said wheel structure and that are arranged and adapted to be driven by moving water impinging on said blades, paddles or buckets along a water-impinged sector of said water wheel;
said rotor comprises a rotor ring element arranged concentrically about said axis and connected to said water wheel for rotation therewith about said axis, and plural permanent magnets carried by said rotor ring element;
said stator comprises at least one stator partial ring sector arranged in said water-impinged sector of said water wheel adjacent to and extending along a portion of said rotor ring element, and plural electrical coils carried by said at least one stator partial ring sector adjacent to some of said permanent magnets; and
said stator further comprises mounting elements that stationarily connect and mount said at least one stator partial ring sector to said stationary support structure.

2. The water wheel apparatus according to claim 1, wherein said rotor ring element comprises and is modularly assembled from plural individual rotor partial ring sectors.

3. The water wheel apparatus according to claim 2, wherein said wheel structure comprises and is modularly assembled from plural individual wheel rim sectors, and said individual rotor partial ring sectors are respectively individually allocated to and integrated in said individual wheel rim sectors.

4. The water wheel apparatus according to claim 1, wherein said at least one stator partial ring sector extends around only a sectorial portion of a complete circle about said axis.

5. The water wheel apparatus according to claim 4, wherein said sectorial portion of said complete circle corresponds to at least a one-third sector and not more than a one-half sector of said complete circle at a bottom portion of said water wheel below said axis.

6. The water wheel apparatus according to claim 1, wherein said at least one stator partial ring sector includes plural stator partial ring sectors.

7. The water wheel apparatus according to claim 1, wherein said permanent magnets are arranged on at least one surface of said rotor ring element selected from the group consisting of an inner circumferential surface, an outer circumferential surface, a front side surface, or a rear side surface, and wherein said at least one stator partial ring sector is configured and arranged to carry said electrical coils adjacent to at least some of said permanent magnets.

8. The water wheel apparatus according to claim 7, wherein said electrical coils are arranged adjacent to and facing said permanent magnets with a field gap therebetween.

9. The water wheel apparatus according to claim 7, wherein respective sets of said permanent magnets are respectively arranged on a plurality of said surfaces of said rotor ring element.

10. The water wheel apparatus according to claim 9, wherein said plurality of said surfaces of said rotor ring element include two oppositely facing surfaces of said rotor ring element, and wherein said at least one stator partial ring sector includes two stator partial ring sectors arranged spaced apart from one another with said rotor ring element received therebetween and with two respective sets of said electrical coils that are respectively carried by said two stator partial ring sectors and that respectively face said respective sets of said permanent magnets on said two oppositely facing surfaces of said rotor ring element.

11. The water wheel apparatus according to claim 10, wherein said two respective sets of said electrical coils are staggered from one another by one-half of a width of one of said electrical coils in a rotational direction about said axis.

12. The water wheel apparatus according to claim 1, wherein said permanent magnets are set into said rotor ring element in a pattern of successive teeth of a comb.

13. The water wheel apparatus according to claim 1, wherein said at least one electrical generator includes two of said electrical generators arranged respectively at two axially opposite sides of said water wheel.

14. The water wheel apparatus according to claim 4, wherein said sectorial portion amounts to less than one half of said complete circle.

15. The water wheel apparatus according to claim 4, wherein said sectorial portion amounts to about one third of said complete circle.

16. The water wheel apparatus according to claim 4, wherein said sectorial portion amounts to about one quarter of said complete circle.

17. The water wheel apparatus according to claim 4, wherein said sectorial portion of said complete circle spans no more than said water-impinged sector of said water wheel plus a circumferential sector including two of said blades, paddles or buckets in a circumferential direction about said axis.

18. The water wheel apparatus according to claim 1, wherein said stator is confined to a half of a circle on one side of said axis including said water-impinged sector.

19. The water wheel apparatus according to claim 18, wherein said stationary support structure is located in said half of said circle.

20. The water wheel apparatus according to claim 18, wherein said water-impinged sector is confined to said half of said circle.

21. The water wheel apparatus according to claim 1, wherein said stator extends in a circumferential direction about said axis along said water impinged sector of said water wheel plus a circumferential sector including no more than two of said blades, paddles or buckets.

22. The water wheel apparatus according to claim 1,
wherein said wheel structure includes a central wheel hub that is located concentrically on said axis and is rotatably supported relative to said stationary support structure, a peripheral wheel rim arranged concentrically about and radially spaced from said wheel hub, and a plurality of spokes extending radially outwardly from said wheel hub and connecting said wheel rim to said wheel hub,
wherein said rotor ring element is mounted on said spokes radially between said wheel hub and said wheel rim, and
wherein said mounting elements comprise arc-shaped mounting arms which extend from said stationary support structure and on which said at least one stator partial ring sector is mounted.

\* \* \* \* \*